United States Patent [19]

Kakizaki

[11] Patent Number: 5,463,477
[45] Date of Patent: Oct. 31, 1995

[54] MOBILE COMMUNICATION METHOD AND MOBILE COMMUNICATION SYSTEM FOR DELETING FILL CODE IN RADIO CIRCUIT

[75] Inventor: Akemi Kakizaki, Tokyo, Japan

[73] Assignee: NEC Corporation, Tokyo, Japan

[21] Appl. No.: 247,079

[22] Filed: May 20, 1994

[30] Foreign Application Priority Data

May 21, 1993 [JP] Japan .................... 5-119921

[51] Int. Cl.$^6$ .................................. H04N 1/32
[52] U.S. Cl. ................ 358/431; 358/442; 379/61
[58] Field of Search ....................... 358/431, 434, 358/438, 439, 442; 379/58, 59, 61, 100; 455/33.1, 54.1, 56.1; H04N 1/41

[56] References Cited

U.S. PATENT DOCUMENTS

| | | | |
|---|---|---|---|
| 4,933,770 | 6/1990 | DeSpain | 379/100 |
| 4,947,268 | 8/1990 | Nakajiri et al. | 358/431 |
| 5,200,991 | 4/1993 | Motoyanagi | 379/61 |
| 5,282,238 | 1/1994 | Berland | 358/431 |

FOREIGN PATENT DOCUMENTS 58-039160  3/1983  Japan .
63-009277  1/1988  Japan .

*Primary Examiner*—Edward L. Coles, Sr.
*Assistant Examiner*—Kim Yen Vu
*Attorney, Agent, or Firm*—Foley & Lardner

[57] ABSTRACT

A mobile communication system requires no fill code in a signal transmitted by way of radio communication between a mobile station and a radio base station. In a radio base station or a mobile station, a base station fill controller or a mobile station fill controller deletes a fill code from a picture signal which has been delivered from a facsimile apparatus connected thereto and which is to be transmitted to another facsimile apparatus through a radio circuit, and a base station fill controller or a mobile station fill controller inserts a fill code into a picture signal transmitted from another facsimile apparatus through the radio circuit such that the scan time of the picture signal is not shorter than the minimum scan line time of the facsimile apparatus connected thereto which is read from a base station terminal ability memory or a mobile station terminal ability memory. The picture signal with the inserted fill code is then delivered to the facsimile apparatus connected thereto.

7 Claims, 1 Drawing Sheet

5,463,477

MOBILE COMMUNICATION METHOD AND MOBILE COMMUNICATION SYSTEM FOR DELETING FILL CODE IN RADIO CIRCUIT

BACKGROUND OF THE INVENTION

1. Field of the Invention

The present invention relates to a mobile communication method and a mobile communication system for transmitting and receiving a facsimile picture signal between a radio base station and a mobile station through a radio circuit.

2. Description of the Prior Art

Facsimile communications are finding more and more use in mobile communication systems. For transmitting a picture signal from a transmitting facsimile apparatus in a mobile station or a radio base station to a receiving facsimile apparatus over a radio circuit, it has been customary for the transmitting facsimile apparatus to send to the radio circuit a picture signal with one fill code inserted per scanning line to match the minimum scan line time (hereinafter referred to as "MSLT") of the receiving facsimile apparatus.

While a picture signal of the prior art is transmitted from the transmitting facsimile equipment over the radio circuit with one fill code inserted per scanning line, the fill code is only used for formatting the picture and otherwise has no message content. As a result, the transmission efficiency of the radio circuit has heretofore been low because the amount of transmitted information is increased by the inserted fill code.

Various efforts have been made to avoid the above shortcomings. For example, Japanese patent laid-open No. S58-39160 (39160/83) discloses an arrangement for deleting a fill code from data transmitted from a facsimile apparatus to a computer. Deletion of a fill code at the time image data are stored by a computer is disclosed in Japanese patent laid-open No. S63-9277 (9277/88). However, no attempts have heretofore been made to delete a fill code for radio communications.

SUMMARY OF THE INVENTION

It is therefore an object of the present invention to provide a mobile communication system which requires no fill code in a signal transmitted by way of radio communication between a mobile station and a radio base station, and a mobile communication method to be used in such a mobile communication system.

To achieve the above object, there is provided in accordance with the present invention a mobile communication method in a mobile communication system for transmitting and receiving a picture signal between a facsimile apparatus connected to a radio base station and a facsimile apparatus connected to a mobile station through a radio circuit between the radio base station and the mobile station, comprising the steps of deleting a fill code from a picture signal to be transmitted from each of the radio base station and the mobile station to the radio circuit, inserting a fill code into a picture signal received from the radio circuit by each of the radio base station and the mobile station so as to match a minimum scan line time of the facsimile apparatus connected thereto, and transmitting the picture signal with the fill code inserted therein to the facsimile apparatus.

According to the present invention, there is also provided a mobile communication system for transmitting and receiving a picture signal between a facsimile apparatus connected to a radio base station and a facsimile apparatus connected to a mobile station through a radio circuit between the radio base station and the mobile station, comprising means for deleting a fill code from a picture signal to be transmitted from each of the radio base station and the mobile station to the radio circuit, means for inserting a fill code into a picture signal received from the radio circuit by each of the radio base station and the mobile station so as to match a minimum scan line time of the facsimile apparatus connected thereto, and means for transmitting the picture signal with the fill code inserted therein to the facsimile apparatus.

According to the present invention, there is further provided a mobile communication system for transmitting and receiving a picture signal between a facsimile apparatus connected to a radio base station and a facsimile apparatus connected to a mobile station through a radio circuit between the radio base station and the mobile station, the system comprising a radio base station and a mobile station capable of radio communication with the radio base station through a radio circuit; the radio base station comprising base station fill code deleting means for deleting a fill code from a picture signal to be transmitted through the radio circuit to the mobile station, a base station terminal ability memory for storing a first minimum scan line time of a first facsimile apparatus connected to the radio base station, and base station fill code inserting means for reading the first minimum scan line time from the base station terminal ability memory, inserting a fill code into a first picture signal which is received through the radio circuit such that a scan time of the first picture signal is not shorter than the first minimum scan line time read from the base station terminal ability memory, and transmitting the first picture signal with the inserted fill code to the first facsimile apparatus; the mobile base station comprising mobile station fill code deleting means for deleting a fill code from a picture signal to be transmitted through the radio circuit to the radio base station, a mobile station terminal ability memory for storing a second minimum scan line time of a second facsimile apparatus connected to the mobile station, and mobile station fill code inserting means for reading the second minimum scan line time from the mobile station terminal ability memory, inserting a fill code into a second picture signal which is received through the radio circuit such that a scan time of the second picture signal is not shorter than the second minimum scan line time read from the mobile station terminal ability memory, and transmitting the second picture signal with the inserted fill code to the second facsimile apparatus.

Preferably, the base station fill code deleting means may comprise means for detecting and deleting a fill code per scanning line from a picture signal to be transmitted from the first facsimile apparatus through the radio circuit to the mobile station, and the base station fill code inserting means may comprise means for detecting an end-of-line code in the first picture signal which is received through the radio circuit and inserting a fill code between picture data of the first picture signal and the end-of-line code which follows the first picture signal per scanning line based on the first minimum scan line time read from the base station terminal ability memory; and also preferably the mobile station fill code deleting means may comprise means for detecting and deleting a fill code per scanning line from a picture signal to be transmitted from the second facsimile apparatus through the radio circuit to the radio base station, and the mobile station fill code inserting means may comprise means for detecting an end-of-line code in the second picture signal which is received through the radio circuit and inserting a fill code between picture data of the second picture signal and the end-of-line code which follows the second picture signal per scanning line based on the second minimum scan line time read from the mobile station terminal ability memory.

Preferably, the radio base station may further comprise base station picture signal memory means for temporarily storing the first picture signal which is received through the radio circuit, the base station fill code inserting means comprising means for inserting a fill code into the first picture signal which is stored in the base station picture signal memory means; and also preferably the mobile station may further comprise mobile station picture signal memory means for temporarily storing the second picture signal which is received through the radio circuit, the mobile station fill code inserting means comprising means for inserting a fill code into the second picture signal which is stored in the mobile station picture signal memory means.

Preferably, the radio base station may further comprise base station picture signal memory means for temporarily storing the first picture signal which is received through the radio circuit, the base station fill code inserting means comprising means for inserting a fill code into the first picture signal which is stored in the base station picture signal memory means; and also preferably the mobile station may further comprise mobile station picture signal memory means for temporarily storing the second picture signal which is received through the radio circuit, the mobile station fill code inserting means comprising means for inserting a fill code into the second picture signal which is stored in the mobile station picture signal memory means.

In the radio base station or the mobile station, therefore, the base station fill code deleting means or the mobile station fill code deleting means deletes a fill code from the picture signal which has been delivered from the facsimile apparatus connected thereto and which is to be transmitted to another facsimile apparatus through the radio circuit, and the base station fill code inserting means or the mobile station fill inserting means inserts a fill code into the picture signal transmitted from another facsimile apparatus through the radio circuit such that the scan time of the picture signal is not shorter than the minimum scan line time of the facsimile apparatus connected thereto which is read from the base station terminal ability memory or the mobile station terminal ability memory. The picture signal with the inserted fill code is then delivered to the facsimile apparatus connected thereto.

Since the fill code which has been inserted into the picture signal to match the minimum scan line time of the facsimile apparatus is deleted and then the picture signal is transmitted over the radio circuit, the amount of information transmitted over the radio circuit can be reduced for improved transmission efficiency of the radio circuit.

The above and other objects, features, and advantages of the present invention will become apparent from the following description when taken in conjunction with the accompanying drawing which illustrates a preferred embodiment of the present invention by way of example.

BRIEF DESCRIPTION OF THE DRAWING

The sole FIGURE is a block diagram of a mobile communication system according to the present invention.

DETAILED DESCRIPTION OF THE PREFERRED EMBODIMENT

Figure 1:
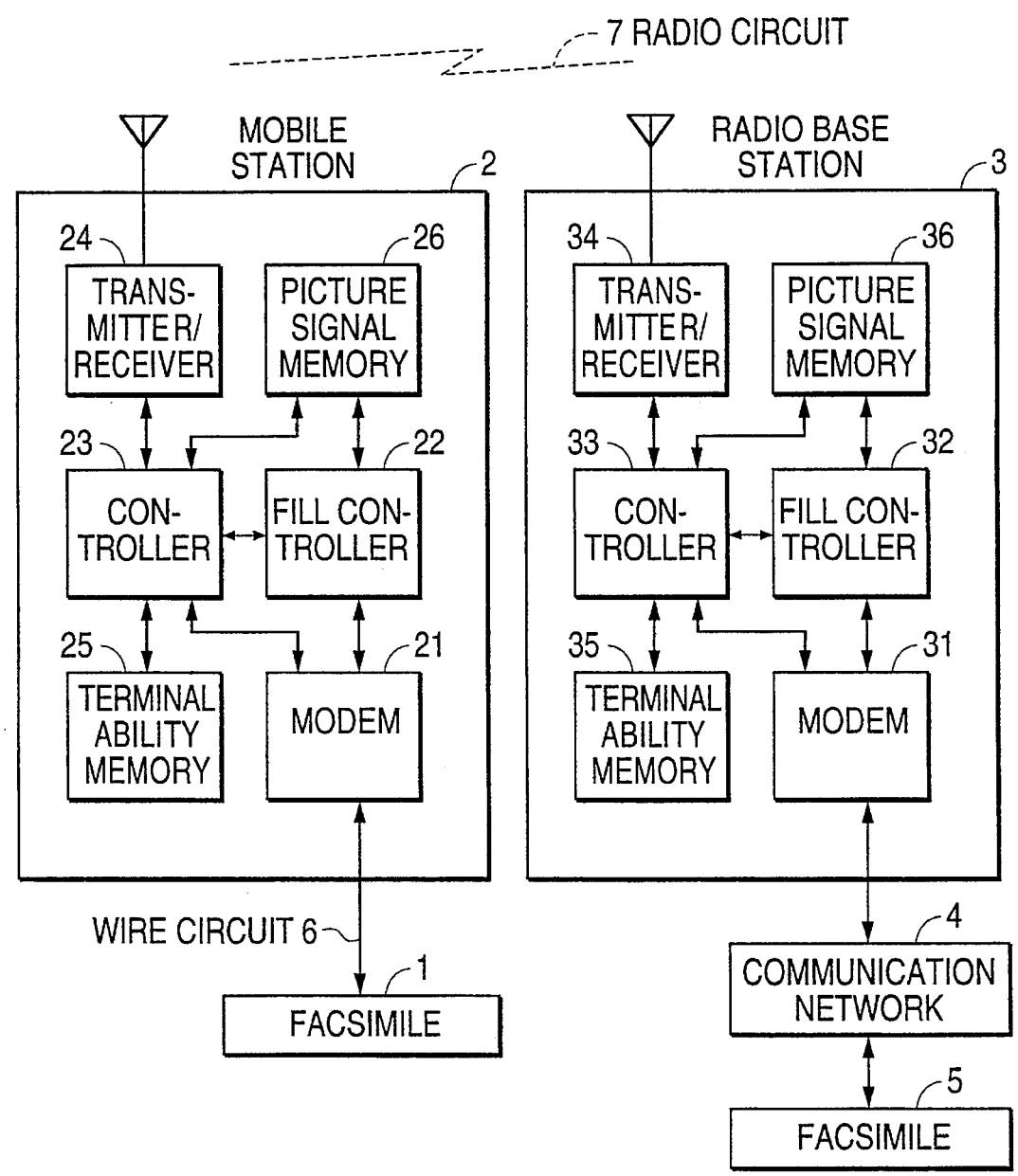

As shown in the sole FIGURE, a mobile communication system according to the present invention generally comprises a facsimile apparatus 1, a mobile station 2, a radio base station 3, a public communication network 4, a facsimile apparatus 5, and a wire circuit 6.

The mobile station 2 transmits and receives a picture signal and a communication procedure signal to and from the facsimile apparatus 1 over the wire circuit 6. The mobile station 2 and the radio base station 3 exchange a picture signal and a communication procedure signal with a fill signal deleted therefrom over a radio circuit 7. The radio base station 3 transmits and receives a picture signal and a communication procedure signal to and from the facsimile apparatus 5 over the public communication network 4.

The mobile station 2 comprises a mobile station modem 21, a mobile station fill controller 22, a mobile station controller 23, a mobile station transmitter/receiver 24, a mobile station terminal ability memory 25, and a mobile station picture signal memory 26. The radio base station 3 comprises a base station modem 31, a base station fill controller 32, a base station controller 33, a base station transmitter/receiver 34, a base station terminal ability memory 35, and a base station picture signal memory 36.

When the mobile station 2 receives a modulated signal transmitted from the facsimile apparatus 1, the mobile station modem 21 demodulates a picture signal and a communication procedure signal in the received modulated signal into an original picture signal and an original communication procedure signal. When the mobile station 2 is to transmit a signal to the facsimile apparatus 1, the mobile station modem 21 modulates a picture signal and a communication procedure signal, and outputs the modulated signals through the wire circuit 6 to the facsimile apparatus 1.

When a picture signal from the facsimile apparatus 1 is received by the mobile station modem 21, the mobile station fill controller 22 detects and deletes a fill code from the received picture signal, and thereafter transmits the picture signal to the mobile station controller 23. When a picture signal from the radio circuit 7 is received and stored through the mobile station transmitter/receiver 24 and the mobile station controller 23 into the mobile station picture signal memory 26, the mobile station fill controller 22 detects an end-of-line code in the picture signal, inserts a fill code between the picture data and the detected end-of-line code which follows the picture data per scanning line, and thereafter transmits the picture signal with the inserted fill code to the mobile station modem 21. The picture signal with the inserted fill code is of such a nature that its scan line time is not shorter than the minimum scan line time (MSLT) of the facsimile apparatus 1, which the mobile station fill controller 22 has read from the mobile station terminal ability memory 25.

The mobile station controller 23 converts a wire signal into a radio signal or a radio signal into a wire signal. The mobile station controller 23 also recognizes the ability (MSLT) of the facsimile apparatus 1 connected to the mobile station 2 according to a procedure signal DIS, and stores data about the recognized MSLT in the mobile station terminal ability memory 25. The mobile station controller 23 further serves to control the mobile station 2 in its entirety.

The mobile station transmitter/receiver 24 transmits and receives a picture signal and a communication procedure signal to and from the radio base station 3 over the radio circuit 7.

The mobile station terminal ability memory 25 stores data about the ability (MSLT) of the facsimile apparatus 1.

The mobile station picture signal memory 26 stores a picture signal received from the radio circuit 7.

When the radio base station 3 receives a modulated signal transmitted from the facsimile apparatus 5, the base station modem 31 demodulates a picture signal and a communication procedure signal in the received modulated signal into an original picture signal and an original communication procedure signal. When the base station 3 is to transmit a signal to the facsimile apparatus 5, the base station modem 31 modulates a picture signal and a communication procedure signal, and outputs the modulated signals through the public communication network 4 to the facsimile apparatus 5.

When a picture signal from the facsimile apparatus 5 is received by the base station modem 31, the base station fill controller 32 detects and deletes a fill code from the received picture signal, and thereafter transmits the picture signal to the base station controller 33. When a picture signal from the radio circuit 7 is received and stored through the base station transmitter/receiver 34 and the base station controller 33 into the base station picture signal memory 36, the base station fill controller 32 detects an end-of-line code in the picture signal, inserts a fill code between the picture data and the detected end-of-line code which follows the picture data per scanning line, and thereafter transmits the picture signal with the inserted fill code to the base station modem 31.

The base station controller 33 converts a wire signal into a radio signal or a radio signal into a wire signal. The base station controller 33 also recognizes the ability (MSLT) of the facsimile apparatus 5 connected to the base station 3 according to a procedure signal DIS, and stores data about the recognized MSLT in the base station terminal ability memory 35. The base station controller 33 further serves to control the radio base station 3 in its entirety.

The base station transmitter/receiver 34 transmits and receives a picture signal and a communication procedure signal to and from the mobile station 2 over the radio circuit 7.

The base station terminal ability memory 35 stores data about the ability (MSLT) of the facsimile apparatus 5.

The base station picture signal memory 36 stores a picture signal received from the radio circuit 7.

Operation of the mobile communication system will be described below. Phases B, C described below are defined in Recommendation T.30 of C.C.I.T.T. Specifically, Phase B is defined as Pre-message procedure for identifying and selecting the required facilities, and Phase C is defined as Message transmission (includes phasing and synchronization where appropriate).

Transmission of signals from the facsimile apparatus 1 connected to the mobile station 1 to the facsimile apparatus 5 connected to the radio base station 3 through the public communication network 4 is effected as follows: In Phase B, a modulated procedure signal transmitted from the facsimile apparatus 5 through the public communication network 4 to the radio base station 3 is demodulated by the base station modem 31, and the demodulated procedure signal is converted into radio signal data by the base station controller 33. The ability (MSLT) of the facsimile apparatus 5 is recognized according to DIS in the procedure signal, and its data are stored in the base station terminal ability memory 35. The radio signal data are transmitted from the base station transmitter/receiver 34 through the radio circuit 7 to the mobile station 2. In the mobile station 2, the radio signal data transmitted through the radio circuit 7 are received by the mobile station transmitter/receiver 24, and converted into a procedure signal by the mobile station controller 23. The procedure signal is then stored in the mobile station modem 21 and transmitted over the wire circuit 6 to the facsimile apparatus 1. In the facsimile apparatus 1, a procedure signal to be transmitted is generated according to the received procedure signal, and transmitted over the wire circuit 6 to the mobile station 2. In the mobile station 2, the received procedure signal is demodulated by the mobile station modem 21 and converted by the mobile station controller 23 into radio signal data, which are then transmitted from the mobile station transmitter/receiver 24 over the radio circuit 7 to the radio base station 3. In the radio base station 3, the radio signal data from the mobile station 2 are received by the base station transmitter/receiver 34 and converted into a procedure signal by the base station controller 33. The procedure signal is then modulated by the base station modem 31, and the modulated procedure signal is transmitted over the public communication network 4 to the facsimile apparatus 5.

In Phase C, a modulated picture signal transmitted from the facsimile apparatus 1 over the wire circuit 6 to the mobile station 2 is demodulated by the mobile station modem 21. The mobile station fill controller 22 detects and deletes a fill code from the demodulated picture signal. The picture signal is then converted by the mobile station controller 23 into radio signal data, which are transmitted from the mobile station transmitter/receiver 24 over the radio circuit 7 to the radio base station 3. In the radio base station 3, the radio signal data from the mobile station 2 are received by the base station transmitter/receiver 34 and converted into a picture signal by the base station controller 33. The picture signal is then stored in the base station picture signal memory 36. The base station fill controller 32 reads the stored picture signal from the base station picture signal memory 36, and detects an end-of-line code in the picture signal. Then, the base station fill controller 32 inserts a fill code between the picture data and the detected end-of-line code in a manner to match the ability (MSLT) of the facsimile apparatus 5 which is stored in the base station terminal ability memory 35. The picture signal with the inserted fill code is sent from the base station fill controller 32 to the base station modem 31. The base station modem 31 modulates the picture signal delivered from the base station fill controller 32, and transmits the modulated picture signal over the public communication network 4 to the facsimile apparatus 5.

While the transmission of signals from the facsimile apparatus 1 connected to the mobile station 1 to the facsimile apparatus 5 connected to the radio base station 3 through the public communication network 4 has been described in the above embodiment, a procedure signal and a picture signal transmitted from the facsimile apparatus 5 to the facsimile apparatus 1 may be processed in the same manner as described above except that the signals are delivered in the opposite direction.

In the mobile communication system, a plurality of facsimile apparatus may be connected to the radio base station 3 through the public communication network 4, and a plurality of facsimile apparatus may be connected to the mobile station 2 through the wire circuit 6.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A mobile communication method in a mobile communication system for transmitting and receiving a picture signal between a facsimile apparatus connected to a radio base station and a facsimile apparatus connected to a mobile station through a radio circuit between the radio base station and the mobile station, comprising the steps of:

deleting a fill code from a picture signal to be transmitted from each of the radio base station and the mobile station to the radio circuit;

inserting a fill code into a picture signal received from the radio circuit by each of the radio base station and the mobile station so as to match a minimum scan line time of the facsimile apparatus connected thereto; and transmitting the picture signal with the fill code inserted therein to the facsimile apparatus.

2. A mobile communication system for transmitting and receiving a picture signal between a facsimile apparatus connected to a radio base station and a facsimile apparatus connected to a mobile station through a radio circuit between the radio base station and the mobile station, comprising:

means for deleting a fill code from a picture signal to be transmitted from each of the radio base station and the mobile station to the radio circuit;

means for inserting a fill code into a picture signal received from the radio circuit by each of the radio base station and the mobile station so as to match a minimum scan line time of the facsimile apparatus connected thereto; and means for transmitting the picture signal with the fill code inserted therein to the facsimile apparatus.

3. A mobile communication system for transmitting and receiving a picture signal between a first facsimile apparatus connected to a radio base station and a second facsimile apparatus connected to a mobile station through a radio circuit between the radio base station and the mobile station, said radio base station comprising:

base station fill code deleting means for deleting a fill code from a picture signal to be transmitted through the radio circuit to said mobile station;

a base station terminal ability memory means for storing a first minimum scan line time of said first facsimile apparatus; and base station fill code inserting means for reading said first minimum scan line time from said base station terminal ability memory means, inserting a fill code into a first picture signal which is received through the radio circuit such that a scan time of the first picture signal is not shorter than said first minimum scan line time read from said base station terminal ability memory means, and transmitting the first picture signal with the inserted fill code to said first facsimile apparatus;

said mobile base station comprising:

mobile station fill code deleting means for deleting a fill code from a picture signal to be transmitted through the radio circuit to said radio base station;

a mobile station terminal ability memory means for storing a second minimum scan line time of said second facsimile apparatus; and mobile station fill code inserting means for reading said second minimum scan line time from said mobile station terminal ability memory means, inserting a fill code into a second picture signal which is received through the radio circuit such that a scan time of the second picture signal is not shorter than said second minimum scan line time read from said mobile station terminal ability memory means, and transmitting the second picture signal with the inserted fill code to said second facsimile apparatus.

4. A mobile communication system according to claim 3, wherein said base station fill code deleting means comprises means for detecting and deleting a fill code per scanning line from a picture signal to be transmitted from the first facsimile apparatus through the radio circuit to said mobile station, and said base station fill code inserting means comprises means for detecting an end-of-line code in the first picture signal which is received through the radio circuit and inserting a fill code between picture data of the first picture signal and the end-of-line code which follows the first picture signal per scanning line based on said first minimum scan line time read from said base station terminal ability memory means, and Wherein said mobile station fill code deleting means comprises means for detecting and deleting a fill code per scanning line from a picture signal to be transmitted from the second facsimile apparatus through the radio circuit to said radio base station, and said mobile station fill code inserting means comprises means for detecting an end-of-line code in the second picture signal which is received through the radio circuit and inserting a fill code between picture data of the second picture signal and the end-of-line code which follows the second picture signal per scanning line based on said second minimum scan line time read from said mobile station terminal ability memory means.

5. A mobile communication system according to claim 3, wherein said radio base station further comprises base station picture signal memory means for temporarily storing the first picture signal which is received through the radio circuit, said base station fill code inserting means comprising means for inserting a fill code into the first picture signal which is stored in said base station picture signal memory means, and wherein said mobile station further comprises mobile station picture signal memory means for temporarily storing the second picture signal which is received through the radio circuit, said mobile station fill code inserting means comprising means for inserting a fill code into the second picture signal which is stored in said mobile station picture signal memory means.

6. A mobile communication system according to claim 4, wherein said radio base station further comprises base station picture signal memory means for temporarily storing the first picture signal which is received through the radio circuit, said base station fill code inserting means comprising means for inserting a fill code into the first picture signal which is stored in said base station picture signal memory means, and wherein said mobile station further comprises mobile station picture signal memory means for temporarily storing the second picture signal which is received through the radio circuit, said mobile station fill code inserting means comprising means for inserting a fill code into the second picture signal which is stored in said mobile station picture signal memory means.

7. A mobile communication system according to claim 2, further comprising a plurality of facsimile apparatus connected to said radio base station through a public communication network, and a plurality of facsimile apparatus connected to said mobile station through a wire circuit.

* * * * *